Oct. 28, 1969 C. E. BENDER ET AL 3,474,543
METHOD AND APPARATUS FOR SIMULTANEOUSLY FREEZE DRYING
A PLURALITY OF BACTERIAL CULTURES
Filed Nov. 24, 1967 2 Sheets-Sheet 1

INVENTORS
CHARLES E. BENDER
BY TAYLOR N. THOMPSON

Robert E. Wagner
ATT'Y.

Oct. 28, 1969
C. E. BENDER ET AL
3,474,543
METHOD AND APPARATUS FOR SIMULTANEOUSLY FREEZE DRYING
A PLURALITY OF BACTERIAL CULTURES
Filed Nov. 24, 1967
2 Sheets-Sheet 2
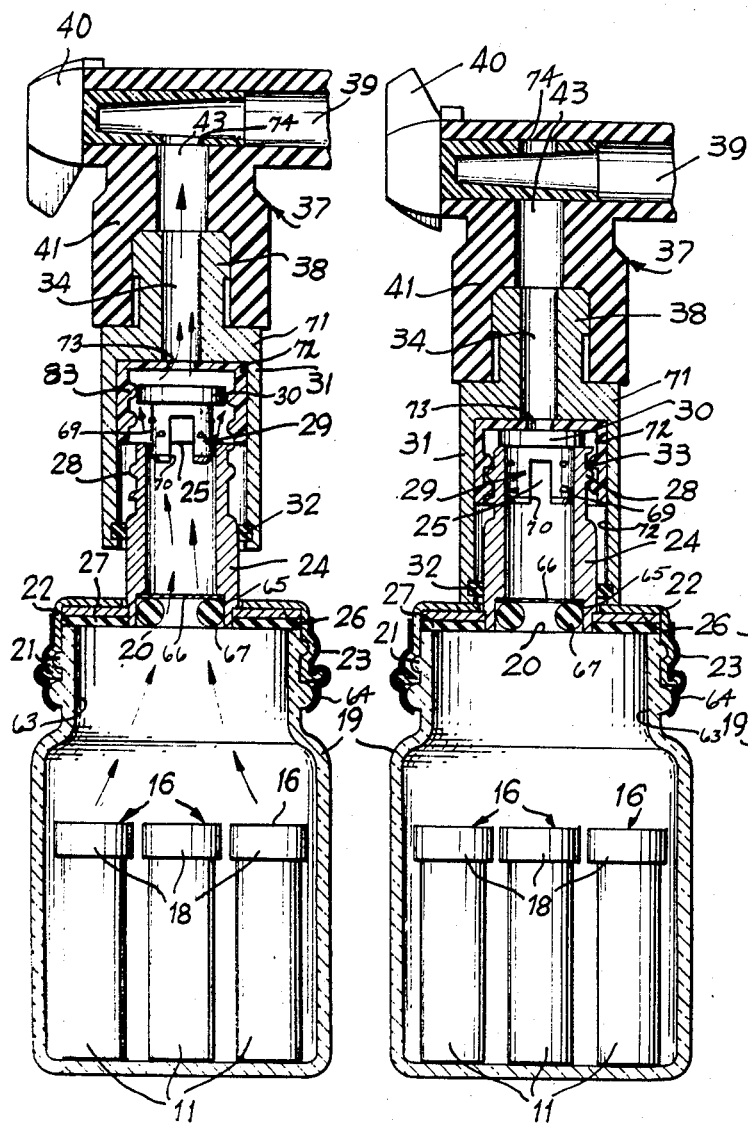
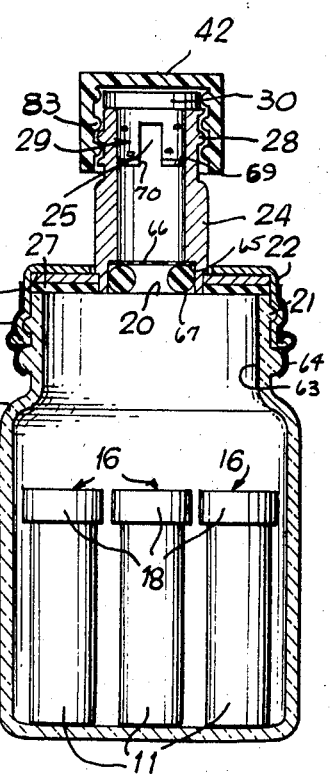
INVENTORS
CHARLES E. BENDER
TAYLOR N. THOMPSON
BY
Robert E. Wagner
ATT'Y.

United States Patent Office 3,474,543
Patented Oct. 28, 1969

3,474,543
METHOD AND APPARATUS FOR SIMULTANEOUSLY FREEZE DRYING A PLURALITY OF BACTERIAL CULTURES
Charles E. Bender and Taylor N. Thompson, New Paltz, N.Y., assignors to The Virtis Company, Inc., Gardiner, N.Y., a corporation of New York
Filed Nov. 24, 1967, Ser. No. 685,598
Int. Cl. F26b 5/06, 25/06
U.S. Cl. 34—5                                     5 Claims

ABSTRACT OF THE DISCLOSURE

A method of freeze drying a plurality of bacterial cultures simultaneously in a common receptacle without substantial risk of cross contamination, which includes isolating each culture in a culture container having a gas permeable but bacterially impermeable plug closing off the mouth of the container, positioning each of the containers in a common receptacle, which receptacle is provided with means to operatively place it in communication with a source of vacuum and refrigeration, subjecting the receptacle and culture containers therein to vacuum and refrigeration until the cultures are freeze dried, and thereafter stoppering the receptacle to permit storage of the contents under vacuum.

The culture containers may be of cylindrical form, having an open mouth receiving a gas permeable but bacterially impermeable plug. A cover co-operates with the container to clamp the gas permeable plug at the top of the container. An opening through the cover permits communication with the contents of the culture container through the gas permeable but bacterially impermeable plug. The freeze drying receptacle which receives the multiple culture containers is provided with a wide mouth closed off by an adapter which permits it to be operatively connected to a source of vacuum. The receptacle cover includes the adapter portion and a filter portion which is easily replaced, thus preventing contamination of the vacuum system.

---

This invention relates to a method and apparatus for simultaneously freeze drying a plurality of bacterial cultures or the like without substantial risk of cross contamination between the cultures or contamination of the freeze drying system. Freeze drying is extensively employed in industry to take advantage of its ability to preserve materials and to render them readily soluble. Among the various materials which are freeze dried are pharmaceuticals such as plasma, antibiotics, hormones, perishable foods and various chemical preparations used in industrial applications, to mention a few.

In biological applications, freeze drying has been considered one of the best ways to store cultures for future experimentation, reference, or comparison. When the moisture content of the culture is removed, the molecules are virtually locked into position so that little or no opportunity exists for alteration of the physical or chemical properties of the product.

In the typical laboratory application, the biologist and his assistants are faced with the problem of freeze drying a large number of bacterial cultures, many of which are oftentimes of diverse type. In the past, freeze drying has been accomplished by placing the particular culture in a flask or suitable container and attaching the same to a source of vacuum and refrigeration. In some systems, multi-port manifolds have been used for expediency. Notwithstanding this advance in the techniques of freeze drying, the process, when considered relative to the volume dried, is tedious, laborious, time consuming and, if the number of cultures is large, somewhat unsatisfactory.

The mere mechanical steps of handling a small vial or culture container increases the chances of breakage or loss of the contents which, as pointed out above, are generally very small in volume. Coupled with this are the obvious problems encountered in storing a plurality of small vials or containers. In order to obviate the difficulties encountered in using established prior art procedures, the apparatus and method of the present invention was developed.

The apparatus of the present invention consists of a container having a gas permeable but bacterially impermeable plug securely located in the mouth of the container by means of a closure cap having a central opening therein. A plurality of containers of this type are located in a freeze drying receptacle which is subsequently closed off with a sealed cap having an adapter for connection to a source of vacuum and refrigeration. The adapter includes a resilient plug or stopper means which permits communication with the interior of the chamber of the receptacle and, hence, communication through the plug with the contents of each of the individual culture containers. When freeze drying is completed, the receptacle and adapter are rotated, causing a threaded cover to force the resilient plug into tight engagement with the adapter opening, thereby sealing the contents of the container.

In one form of the invention, an additional filter means is provided at the base of the adapter consisting of a filter paper of conventional type which is uniquely mounted transversely of the opening and held in position by means of a resilient annulus such as an O-ring or the like. The filter paper functions to preclude the contamination of the vacuum system while permitting communication between the system and the interior of the receptable. As an additional safety feature, seals of the shrinkable type may be placed around the cap which joins the adapter to the receptacle and also around the stopper or plug which seals off the adapter opening, thereby preventing air penetration as well as inadvertent opening of the receptacle. A better appreciation of the novel features of the present invention will be had upon consideration of the following objects and a detailed description.

It is an object of this invention to provide a new and improved method and apparatus for simultaneously freeze drying a plurality of bacterial cultures.

It is a further object of this invention to provide a new and improved apparatus of uncomplicated design adapted for use in freeze drying a plurality of bacterial cultures without risk of cross contamination or contamination of the vacuum system.

It is a still further object of this invention to provide a new and improved method of freeze drying a plurality of bacterial cultures, which cultures may be of diverse type, in an expedient and efficient manner.

Objects other than those set forth will become apparent upon consideration of the accompanying drawings and detailed description to follow.

In the drawings:

FIGURE 3 is a view similar to FIGURE 2, however, illustrating the valve arrangement which permits selective communication with vacuum source and including arrows to indicate the general flow path of the fluid during evacuation;

FIGURE 4 is a view similar to FIGURE 3 illustrating the parts in assembled relation after completion of the stoppering step and with the valve in the closed position;

FIGURE 5 is a cross-sectional view of the receptacle cover and adapter after removal of the receptacle from the source of vacuum and application of a closure cap;

Figure 1:
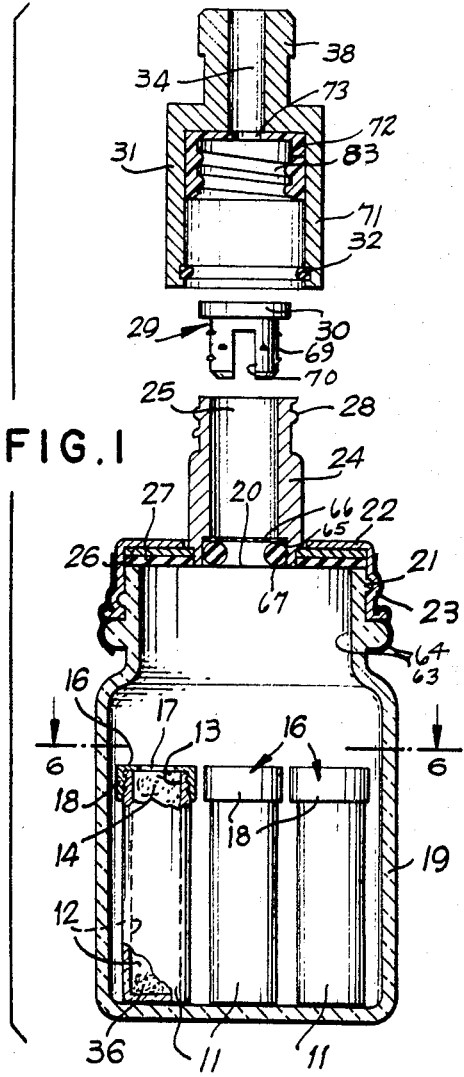
FIGURE 1 is an exploded view of the freeze drying apparatus of the present invention with portions illustrated in cross section.

The basic elements forming the freeze drying apparatus of the present invention are illustrated in FIGURE 1 consisting of culture containers 11 located within a common receptacle 19, the latter being equipped with an adapter 24 which facilitates connection to a source of vacuum through an adapter coupling 31.

Each of the culture containers 11 is of like kind, being formed with an interior wall portion 12 which defines a mouth 13 adjacent the upper end of the culture container. In one form of the invention, the culture containers were formed of clear glass having threads 60 embossed at the upper circumferential portion. These threads 60 co-operate with complementary threads 61 formed in the inner wall of a skirt 18 forming a part of a cover 16. The top panel of the cover or closure cap is provided with an opening or aperture 17 which permits communication with the chamber 12.

Figure 6:
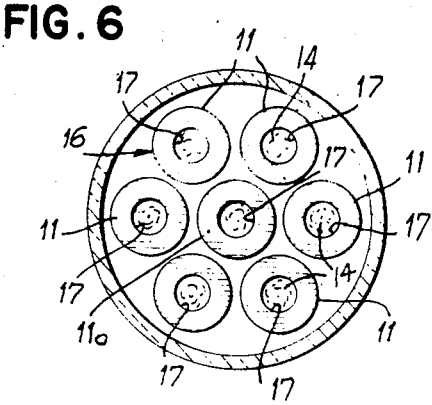
FIGURE 6 is a cross-sectional view taken along the line 6—6 of FIGURE 1 and illustrating the arrangement of the culture containers in the receptacle.
Figure 7:
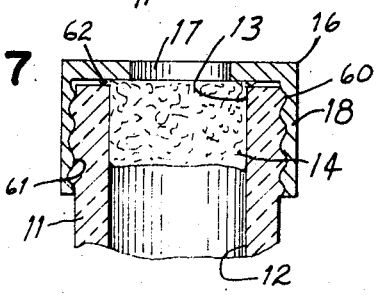
FIGURE 7 is an enlarged cross-sectional view taken through the upper part of the culture container and illustrating the closure cap and the container clamping the gas permeable but bacterially impermeable plug in the mouth of the container.

As seen in FIGURES 6 and 7, the mouth 13 of the culture container 11 receives a plug 14 formed of fibrous material or any suitable equivalent which has the properties of permitting the passage of vapor-laden air while effectively providing a torturous path to preclude the exit of bacteria and the container contents. As best illustrated in FIGURE 7, the plug 14 is held captive in the mouth 13 of the culture container 11 by being clamped between the upper end of the culture container 11 and the underside of the top panel of the closure cap 16. To obtain this desirable end, the plug 14 in its free state is slightly greater in diameter than the inside diameter of the culture container, permitting a slight overhang 62 when the plug is incompletely inserted into the mouth of the container. This feature provides a substantial advantage over known types of vials wherein cotton plugs and the like were utilized. When the vacuum in the vial was broken, the inrush of air served to carry the plug down into the bottom of the vial, oftentimes into engagement with the sample or culture which was freeze dried. Because the relative volume of such sample is generally small, it could be dispersed in the interstices of the cotton plug with the obvious adverse effects.

In the present invention, the plugs 14 are incompletely inserted and the closure cap 16 applied. During the final few turns in applying the cap 16, the overhanging port or flange 62 of the plug is clamped between the top panel of the cap and the upper end of the culture container 11. In this manner, the plug 14 is held captive in a position where it will be readily accessible for removal by tweezers or tongs when the contents of the culture container are to be used.

As seen in FIGURE 6, a plurality of culture containers 11 are disposed in the receptacle 19 with the aperture 17 opening in the direction of the source of vacuum. As seen in FIGURE 1, the receptacle 19 is of the wide-mouth variety to enhance the ease with which the culture containers may be placed and removed within the receptacle 19. The receptacle 19 may consist of a wide-mouth glass jar having conventional threads 21 formed on the finish portion, such threads 21 co-operating with complementary threads 23 formed in the skirt of the cap or cover 22.

The cover 22 is provided with a top panel having a central opening through which projects the adapter 24. The adapter 24 is sealed to the finish through an annular elastomeric gasket 27 with clamping force applied by a laterally extending flange 26 formed at the lower end of the adapter 24. If desired, a shrinkable band 64 may be located externally of the skirt to clamp and seal the lower end of the skirt to the receptacle 19.

The adapter 24 includes a central passage 25 having a counterbore portion 65 at its lower end and into which is received an annular disc 66 formed of filter paper or the equivalent. This is held within the counterbore by an elastomeric O-ring 67 or the equivalent. The simple filter mouning arrangement permits easy replacement of the filter 66, yet the O-ring has sufficient holding power to retain the filter positioned throughout evacuation and also against the inrush of air when the vacuum is subsequently broken.

Figure 2:
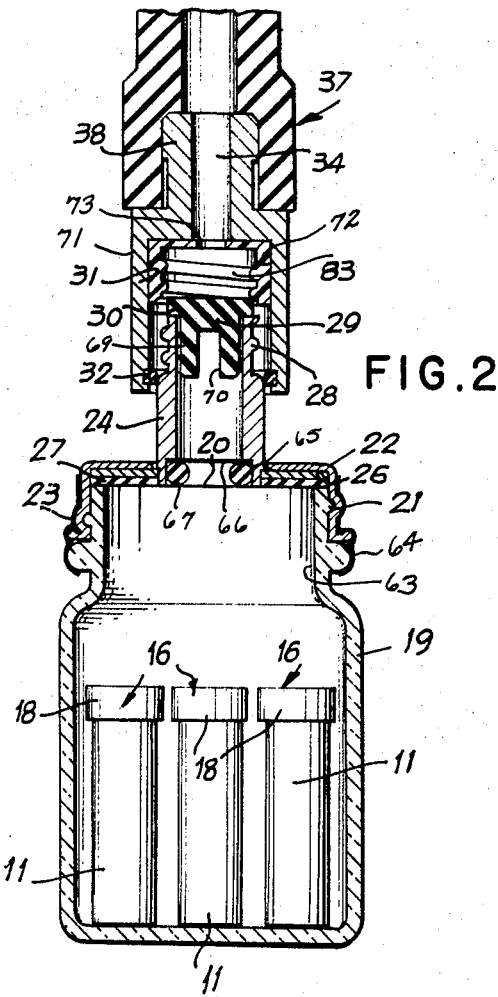
FIGURE 2 is a cross-sectional view of the components of FIGURE 1 in assembled relation with parts shown in full elevation.

The upper end of the adapter 24 is formed with external threads 28 which are adapted for co-operation with a cap in a manner to become apparent. A stopper or plug 30 is formed of resilient material having an enlarged upper flange 68 and axially projecting portions 69 formed with a split 70 for purposes to become apparent. The co-operating manifold adapter 31 is formed with a valve attaching portion 38 and a receptacle receiving portion 71. The receptacle receiving portion is provided with a counterbore 72 which, at its entrance end, is formed with an annular groove receiving an O-ring 32. The O-ring 32 is sized so as to engage the outer circumferential portion of the adapter 24 on the freeze drying receptacle 19 in the manner shown in FIGURES 2–4 to form a vacuum-tight fluid seal. At the lower end of the counterbore is provided a threaded cap 33 which is adapted to engage the flange 30 on the split stopper 29. The threads within the cap 33 co-operate with the threads 28 on the receptacle 19 and associated adapter 24 when they are rotated relative to the manifold adapter 31 to cause the vacuum plug to be forced into the position shown in FIGURE 4 as will be described more completely hereinafter. The top panel of the cap 33 is provided with a central opening 73 which communicates through the passage 34 with the vacuum valve.

A typical freeze drying installation may include joining the attaching portion 38 to a valve 37 which permits selective control of communication of the vacuum with the interior of the receptacle 19 and culture containers 11. The valve 37 has an inlet 39 and adapter receiving portion 41. A rotatable valve element 30 moves a port 74 into communication with the passage 43 in the valve. The passage 43 is co-extensive with the passage 34 in the adapter 31 and the flow path extends through the port 74 and the flow control element 40 and port 39 to the source of vacuum. When the valve is positioned as shown in FIGURE 4, communication with the source of vacuum is terminated.

In a typical installation, culture containers 11 are provided with contents to be freeze dried as indicated at 36 in FIGURE 1. Each of the culture containers receives the gas permeable but bacterially impermeable plug 14 and the cap 16 is screwed into position to clamp the plug in position. The wide-mouth receptacle 19 is filled with culture containers 11, each of which in many instances may include a different type of culture specimen. The cover assembly, consisting of the rubber gasket 27 and adapter 24, is screwed onto the receptacle 19 after a fresh filter 66 has been installed. If desired, a shrinkable band 64 may be placed around the circumference of the skirt of the cover 22 with a port overlying the lower part of the finish of the jar or receptacle 19. A split stopper is inserted with the split 70 positioned as shown in FIGURE 3. The adapter is then inserted into the manifold adapter 31 as shown in FIGURE 3, with the flow control element 40 of the valve subsequently moved to the open position as shown. In this manner, the interior of the receptacle 19 and each of the culture containers 11 is evacuated while being subjected to a reduction in temeprature and the contents 36 of each of the culture containers 11 is freeze dried.

The moisture-laden air within the receptacle 19 is removed along a path denoted by the arrows and, normally, is so rapidly evacuated that it maintains the split stopper in the unseated position shown to permit efficient escape of sublimating water vapor. When drying has been completed, the receptacle 19 is rotated relative to the adapter 31 to cause engagement of the threads moving the adapter 24 and split stopper toward the bottom of the counterbore 72. In the final stages of rotation, the flange 30 on the split stopper 29 engages the underside of the top panel on the cap 33 causing the stopper to be fully seated in the passage 25. If prolonged vacuum retention is required, a threaded cap 83 may be provided on the adapter to clamp the split stopper securely in place. As an additional protection against the loss of vacuum and re-entry of moisture-laden air, a shrinkable band may be provided at the juncture of the cap 83 and the adapter 24 similar to the shrinkable band 64.

From the foregoing, it can be appreciated that the freeze drying process may be readily accomplished in a quick and efficient manner through the use of the method and apparatus of the present invention while cross-contamination between the respective culture containers 11 is effectively prevented through the use of the novel bacterially impermeable plug arrangement. In addition, contamination of the vacuum system is avoided by the filter 66. When it is desired to obtain one of the vials, the cap 83 is removed and the split stopper pried out of the mouth of the adapter 24. As the air rushes into the receptacle 19, it will be filtered through the filter 66 and each of the plugs in the culture receptacles 11. The shrinkable band 64 may then be removed and the cap 22 removed by rotation. Individual culture containers may be removed and the remaining ones evacuated in the manner previously set forth.

Upon a consideration of the foregoing, it will become obvious to those skilled in the art that various modifications may be made without departing from the invention embodied herein. Therefore, only such limitations should be imposed as are indicated by the spirit and scope of the appended claims.

We claim:

1. A freeze drying apparatus for use in simultaneously freeze drying a plurality of bacterial cultures and the like, said freeze drying appartus including a receptacle having a wide mouth, adapter means for fluid-tightly closing off said mouth of said receptable, said adapter means including a neck portion adapted for releasable connection to a source of vacuum, a pluarlity of culture containers disposed within said receptacle, each of said culture containers having a mouth, said mouth being closed off by a gas permeable but bacterially impermeable plug, thereby preventing bacterial contamination between the contents of each of said culture containers while permitting simultaneous freeze drying thereof.

2. The freeze drying apparatus as defined in claim 1 wherein said gas permeable but bacterially impermeable plug is positioned adjacent the mouth of said culture container and further includinig means to hold said plug in said position during evacuation and breaking of said vacuum.

3. The freeze drying apparatus of claim 2 wherein said means holding said plug adjacent the mouth of said culture container comprises a closure cap threadably engaged with a part of said culture container and having a top panel portion overlying a part of said plug to clamp said laterally projecting portion of said plug to an upper end of said culture container, said closure cap having a central opening therein permitting controlled communication with the interior of said culture container.

4. A culture container for use in freeze drying, said culture container comprising a vial having a mouth portion, a gas permeable but bacterially impermeable plug received in said mouth portion, said plug in its free state being of greater diameter than the inner diameter of said vial, said plug having a part thereof overlying an end portion of said vial and cap means clamping the overlying end portion of said plug to the upper end of said vial, said cap means having an opening therein permitting controlled communication with the interior of said vial through said gas permeable but bacterially impermeable plug.

5. A method of simultaneously freeze drying a plurality of independent cultures and the like while preventing cross-contamination therebetween, said method comprising the steps of isolating each of said cultures in a culture container, positioning a gas permeable but bacterially impermeable plug means in a mouth portion of each of said culture containers, confining said plurality of culture containers in a common receptable, and subjecting said receptacle to a source of vacuum accompanied by a reduction in temperature for a sufficient period of time to freeze dry each of said cultures.

References Cited

UNITED STATES PATENTS

| | | | |
|---|---|---|---|
| 2,307,802 | 1/1943 | Reichel | 34—92 |
| 2,353,986 | 7/1944 | Barr | 34—5 |
| 2,477,044 | 7/1949 | Carmean | 34—92 |
| 2,859,534 | 11/1958 | Copson | 34—5 |
| 3,138,937 | 6/1964 | Parkinson | 34—5 |
| 3,246,674 | 4/1966 | Kapeker | 34—5 |
| 3,293,772 | 12/1966 | Gottfreid | 34—92 |
| 3,293,773 | 12/1966 | Frazer | 34—92 |

WILLIAM J. WYE, Primary Examiner

U.S. Cl. X.R.

34—92